US011809554B2

(12) United States Patent
Silberman et al.

(10) Patent No.: US 11,809,554 B2
(45) Date of Patent: Nov. 7, 2023

(54) SYSTEMS AND METHODS FOR INTELLIGENT CYBER SECURITY THREAT DETECTION AND INTELLIGENT VERIFICATION-INFORMED HANDLING OF CYBER SECURITY EVENTS THROUGH AUTOMATED VERIFICATION WORKFLOWS

(71) Applicant: Expel, Inc., Herndon, VA (US)

(72) Inventors: Peter Silberman, Rockville, MD (US); Jonathan Hencinski, Herndon, VA (US); Dan Whalen, Herndon, VA (US); Roger Studner, Herndon, VA (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 18/074,186

(22) Filed: Dec. 2, 2022

(65) Prior Publication Data

US 2023/0108834 A1 Apr. 6, 2023

Related U.S. Application Data

(63) Continuation of application No. 17/671,881, filed on Feb. 15, 2022, now Pat. No. 11,550,907.
(Continued)

(51) Int. Cl.
*H04L 29/06* (2006.01)
*G06F 21/55* (2013.01)

(52) U.S. Cl.
CPC ...... *G06F 21/554* (2013.01); *G06F 2221/034* (2013.01)

(58) Field of Classification Search
CPC .................. G06F 21/554; G06F 2221/034
See application file for complete search history.

(56) References Cited

U.S. PATENT DOCUMENTS

| 8,359,645 B2 * | 1/2013 | Kramer .................. H04L 69/40 726/22 |
| 10,142,829 B2 | 11/2018 | Jin et al. |

(Continued)

*Primary Examiner* — Taghi T Arani
*Assistant Examiner* — Lin Chang
(74) *Attorney, Agent, or Firm* — Padowithz Alce; Chandler Scheitlin; Alce PLLC (57) ABSTRACT

A system and method for automated verification of a cybersecurity event includes identifying a cybersecurity event of a subscriber; automatically constructing a response-enabled verification communication based on one or more features of the cybersecurity event satisfying verification-initiating criteria of an automated verification-initiation workflow, and transmitting the response-enabled verification communication to the subscriber associated with the cybersecurity event, wherein the response-enabled verification communication includes: one or more pieces of event-descriptive content; a first selectable interface object that, when selected by the subscriber, automatically increases a threat severity level of the cybersecurity event; and a second selectable interface object that, when selected by the subscriber, automatically de-escalates the threat severity level of the cybersecurity event causing a disposal of the cybersecurity event; and automatically routing the cybersecurity event to one of a cybersecurity threat escalation route and a cybersecurity threat de-escalation route based on subscriber input.

16 Claims, 4 Drawing Sheets

Related U.S. Application Data

(60) Provisional application No. 63/159,895, filed on Mar. 11, 2021.

(56) References Cited

U.S. PATENT DOCUMENTS

| | | | | |
|---|---|---|---|---|
| 10,299,118 | B1* | 5/2019 | Karachiwala | H04L 67/55 |
| 10,922,423 | B1* | 2/2021 | Rungta | G06F 21/604 |
| 10,958,673 | B1* | 3/2021 | Chen | H04L 63/1466 |
| 11,005,839 | B1* | 5/2021 | Shahidzadeh | H04W 12/06 |
| 11,308,333 | B1* | 4/2022 | Langford | G06V 20/52 |
| 2010/0305997 | A1* | 12/2010 | Ananian | G06Q 10/0633 |
| | | | | 715/843 |
| 2013/0024358 | A1* | 1/2013 | Choudhuri | G06Q 20/4016 |
| | | | | 705/38 |
| 2014/0207679 | A1* | 7/2014 | Cho | H04L 51/046 |
| | | | | 705/44 |
| 2015/0088756 | A1* | 3/2015 | Makhotin | G06Q 20/32 |
| | | | | 705/71 |
| 2017/0063907 | A1* | 3/2017 | Muddu | H04L 43/08 |
| 2017/0134415 | A1 | 5/2017 | Muddu et al. | |
| 2017/0140376 | A1* | 5/2017 | Carraway | G06Q 20/4016 |
| 2017/0329783 | A1* | 11/2017 | Singh | G06F 21/552 |
| 2019/0379683 | A1* | 12/2019 | Overby | H04W 12/122 |
| 2020/0004957 | A1* | 1/2020 | Chamaraju | G06N 20/00 |
| 2020/0220890 | A1* | 7/2020 | George | H04L 63/1425 |
| 2020/0380523 | A1* | 12/2020 | Agrawal | G06Q 20/3226 |
| 2020/0382536 | A1* | 12/2020 | Dherange | H04L 63/1425 |
| 2020/0382560 | A1* | 12/2020 | Woolward | H04L 63/205 |
| 2021/0135854 | A1* | 5/2021 | Karame | G06Q 20/3678 |
| 2021/0224826 | A1* | 7/2021 | Veeraraghavan | G06N 20/00 |
| 2022/0038489 | A1 | 2/2022 | Thakur et al. | |

* cited by examiner

FIGURE 1

Identifying Security Policies Defined by a Subscriber S205

Identifying Data Signals from One or More Data Sources S210

Generating System-Validated Security Alerts based on the Identified Data Signals S220

Identifying and Executing an Automated Workflow that Generates One or More Intelligent Subscriber Inquiries based on the System-Validated Security Alerts S230

Identifying and/or Receiving a Subscriber Input from the One or More Intelligent Subscriber Inquiries S240

SYSTEMS AND METHODS FOR INTELLIGENT CYBER SECURITY THREAT DETECTION AND INTELLIGENT VERIFICATION-INFORMED HANDLING OF CYBER SECURITY EVENTS THROUGH AUTOMATED VERIFICATION WORKFLOWS

CROSS-REFERENCE TO RELATED APPLICATIONS

This application is a continuation of U.S. patent application Ser. No. 17/671,881, filed 15 Feb. 2022, which claims the benefit of U.S. Provisional Application No. 63/159,895, filed 11 Mar. 2021, which is incorporated in its entirety by this reference.

TECHNICAL FIELD

This invention relates generally to the cybersecurity field, and more specifically to a new and useful cyber threat detection and mitigation system and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slowdown the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets. The embodiments of the present application described herein provide technical solutions that address, at least the need described above.

BRIEF SUMMARY OF THE INVENTION(S)

In one embodiment, a method for automated verification of a cybersecurity event includes at a cybersecurity event detection and response service: identifying a cybersecurity event based on event data or activity data associated with one or more computing or digital assets of a subscriber to the cybersecurity event detection and response service; automatically constructing, by one or more computers, a response-enabled verification communication based on one or more features of the cybersecurity event satisfying verification-initiating criteria of an automated verification-initiation workflow, and transmitting the response-enabled verification communication to the subscriber associated with the cybersecurity event, wherein the response-enabled verification communication includes: one or more pieces of event-descriptive content that include event-specific characteristics of the cybersecurity event; a first selectable interface object that, when selected by the subscriber, automatically increases a threat severity level of the cybersecurity event; and a second selectable interface object that, when selected by the subscriber, automatically de-escalates the threat severity level of the cybersecurity event causing a disposal of the cybersecurity event; and automatically routing the cybersecurity event to one of a cybersecurity threat escalation route of the cybersecurity event detection and response service based on identifying a subscriber input associated with the first selectable interface object and a cybersecurity threat de-escalation route of the cybersecurity event detection and response service based on identifying the subscriber input associated with the second selectable interface object.

In one embodiment, the method includes automatically constructing an illustrative cybersecurity event graphic based on likely security critical event data associated with the cybersecurity event, wherein automatically constructing the response-enabled verification communication further includes installing the illustrative cybersecurity event graphic as one of the one or more pieces of event-descriptive content of the response-enabled verification communication.

In one embodiment, the method includes automatically deriving text-based content that includes one or more text strings that textually communicate the event-specific characteristics based on likely security critical event data associated with the cybersecurity event, wherein automatically constructing the response-enabled verification communication includes installing the text-based content as one of the one or more pieces of event-descriptive content of the response-enabled verification communication.

In one embodiment, in response to automatically constructing the response-enabled verification communication: electronically transmitting the response-enabled verification communication to a digital verification queue of the cybersecurity event detection and response service; displaying, via a web-based user interface of the cybersecurity event detection and response service, a representation of the digital verification queue that includes the response-enabled verification communication; and displaying, via the web-based user interface of the cybersecurity event detection and response service, the response-enabled verification communication.

In one embodiment, the method includes while displaying the response-enabled verification communication receiving the subscriber input directed to the first selectable interface object of the response-enabled verification communication.

In one embodiment, the method includes while displaying the response-enabled verification communication receiving the subscriber input directed to the second selectable interface object of the response-enabled verification communication.

In one embodiment, the transmitting of the response-enabled verification communication to the subscriber includes electronically sending the response-enabled verification communication to the subscriber during a pending cybersecurity investigation of the cybersecurity event.

In one embodiment, the transmitting of the response-enabled verification communication includes electronically sending the response-enabled verification communication to an administrator of the subscriber to act on the response-enabled verification communication.

In one embodiment, in response to automatically constructing the response-enabled verification communication electronically transmitting the response-enabled verification communication to the subscriber via a bi-directional third-party messaging channel; and at the bi-directional third-party messaging channel identifying the subscriber input comprising a selection of the first selectable interface object or selection of the second selectable interface object.

In one embodiment, the transmitting of the response-enabled verification communication to the subscriber includes electronically sending the response-enabled verification communication to the subscriber before initiating a cybersecurity investigation of the cybersecurity event.

In one embodiment, the method includes mitigating, via executing one or more cybersecurity threat mitigation actions, a cybersecurity threat associated with the cybersecurity event based on identifying the subscriber input directed to the first selectable interface object of the response-enabled verification communication.

In one embodiment, in response to automatically constructing the response-enabled verification communication selectively identifying a communication transmission destination from a plurality of distinct communication transmission destinations based on a subscriber-defined cybersecurity policy; and transmitting the response-enabled verification communication to the identified communication transmission destination.

In one embodiment, the verification-initiation criteria of the automated verification-initiation workflow includes a cybersecurity event-type criterion; and automatically constructing the response-enabled verification communication is based on a probable cybersecurity event-type associated with the cybersecurity event satisfying the cybersecurity event-type criterion of the automated verification-initiation workflow.

In one embodiment, a method for automated verification of a cybersecurity event includes at a cybersecurity event detection and response service: identifying a cybersecurity event based on event data or activity data associated with one or more computing or digital assets of a subscriber to the cybersecurity event detection and response service; initiating a multi-stage cybersecurity investigation that includes a plurality of cybersecurity investigation stages, wherein the multi-stage cybersecurity investigation includes: executing, at a first investigation stage, one or more automated cybersecurity investigation workflows based on a probable cybersecurity threat type of the cybersecurity event; transmitting, at a second investigation stage, a response-enabled verification communication to the subscriber of the cybersecurity event, wherein the response-enabled verification communication includes a request for a subscriber response to the response-enabled verification to either confirm or not confirm activity associated with the cybersecurity event, and while awaiting the subscriber response to the response-enabled verification communication temporarily suspending the multi-stage cybersecurity investigation pending the subscriber response; and restarting, at a third investigation stage, the temporarily suspended multi-stage cybersecurity investigation based on identifying the subscriber response to the response-enabled verification communication and automatically routing the cybersecurity event to one of a cybersecurity threat escalation route and a cybersecurity threat de-escalation route based on the subscriber response.

In one embodiment, the subscriber response includes both of a selection of one of a plurality of selectable interface objects included in the response-enabled verification communication and one or more cybersecurity event handling instructions.

In one embodiment, the transmitting of the response-enabled verification communication to the subscriber includes simultaneously transmitting the response-enabled verification communication to the subscriber via at least two bi-direction third-party messaging medium.

In one embodiment, the transmitting of the response-enabled verification communication includes transmitting the response-enabled verification communication to an administrator of the subscriber to act on the response-enabled verification communication.

In one embodiment, the second investigation stage occurs at a first period and the third investigation stage occurs at a second period distinct from the first period.

In one embodiment, a method for an automated verification-informed cybersecurity event routing and cybersecurity threat mitigation includes automatically configuring, by one or more computers, a cybersecurity threat verification message based on detecting a suspected cybersecurity event, wherein configuring the cybersecurity threat verification message includes: deriving cybersecurity threat-informative content based on data associated with the suspected cybersecurity event; installing the threat-informative content into the cybersecurity threat verification message together with a request for verification input from a cybersecurity administrator for conforming the suspected cybersecurity event as either a cybersecurity threat or not a cybersecurity threat; transmitting the cybersecurity threat verification message to the cybersecurity administrator based on the construction of the cybersecurity threat verification message; identifying a cybersecurity escalation route from a plurality of distinct cybersecurity escalation routes based on receiving a response to the cybersecurity threat verification message, wherein in response to the identifying the cybersecurity escalation route, routing the suspected cybersecurity event to one of a first cybersecurity handling route that escalates a degree of cybersecurity threat of the suspected cybersecurity event and second cybersecurity handling route that de-escalates the degree of cybersecurity threat of the suspected cybersecurity event.

In one embodiment, the first cybersecurity handling route comprises a cybersecurity incident queue; and the second cybersecurity handling route comprises a cybersecurity event disposal queue.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
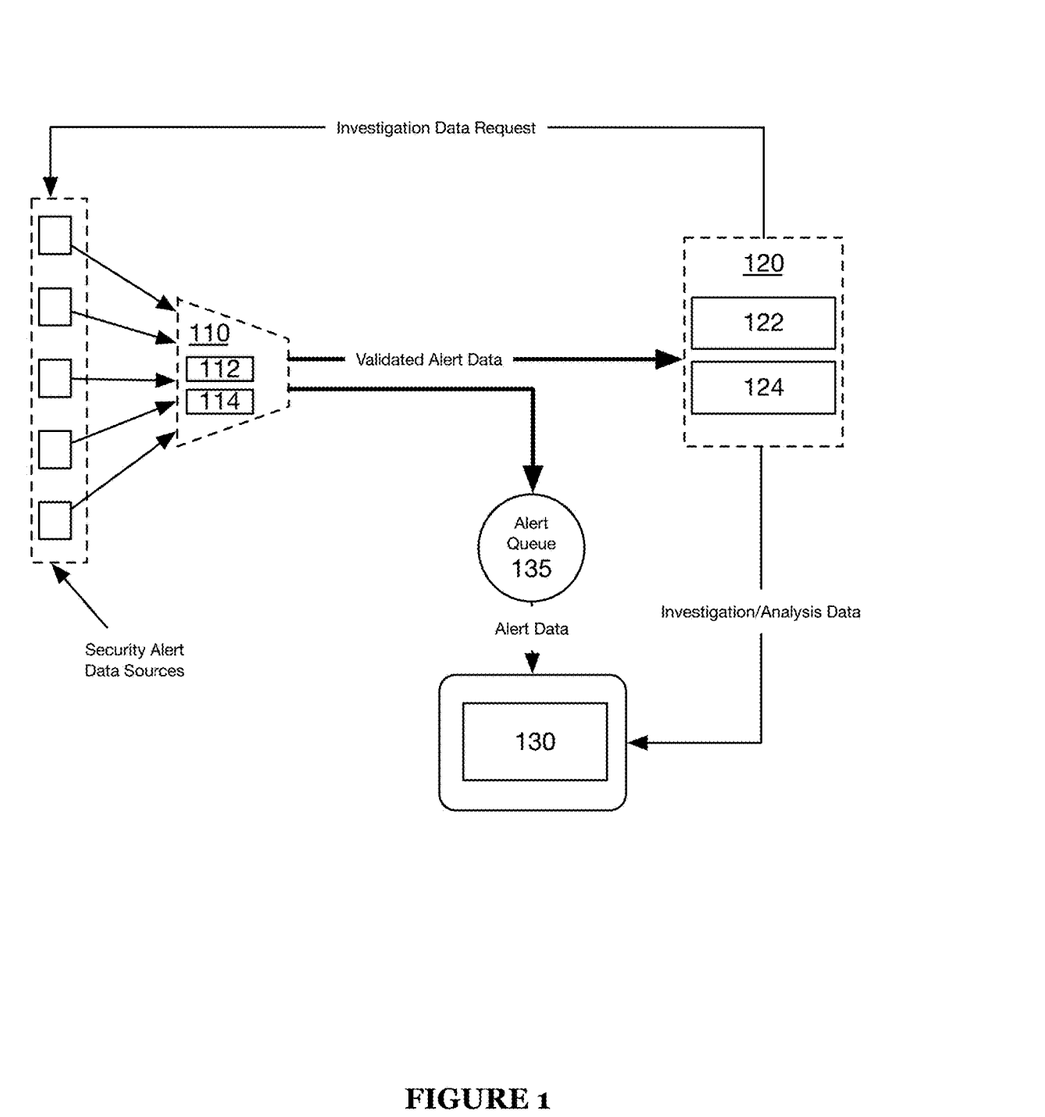
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100 or a cybersecurity event detection and response service.

The system 100 may function to enable real-time cybersecurity threat detection, agile, and intelligent threat response for mitigating detected security threats.

1.1 Security Alert Engine

The security alert aggregation and identification module no, sometimes referred to herein as the "security alert engine 110" may be in operable communication with a plurality of distinct sources of cyber security alert data. In one or more embodiments, the module no may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine no may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct source of security alert data by normalizing all alerts into a predetermined alert format.

1.1.1 Security Alert Machine Learning Classifier

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in or more embodiments, a system user (e.g., an analyst) or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

Figure 2:
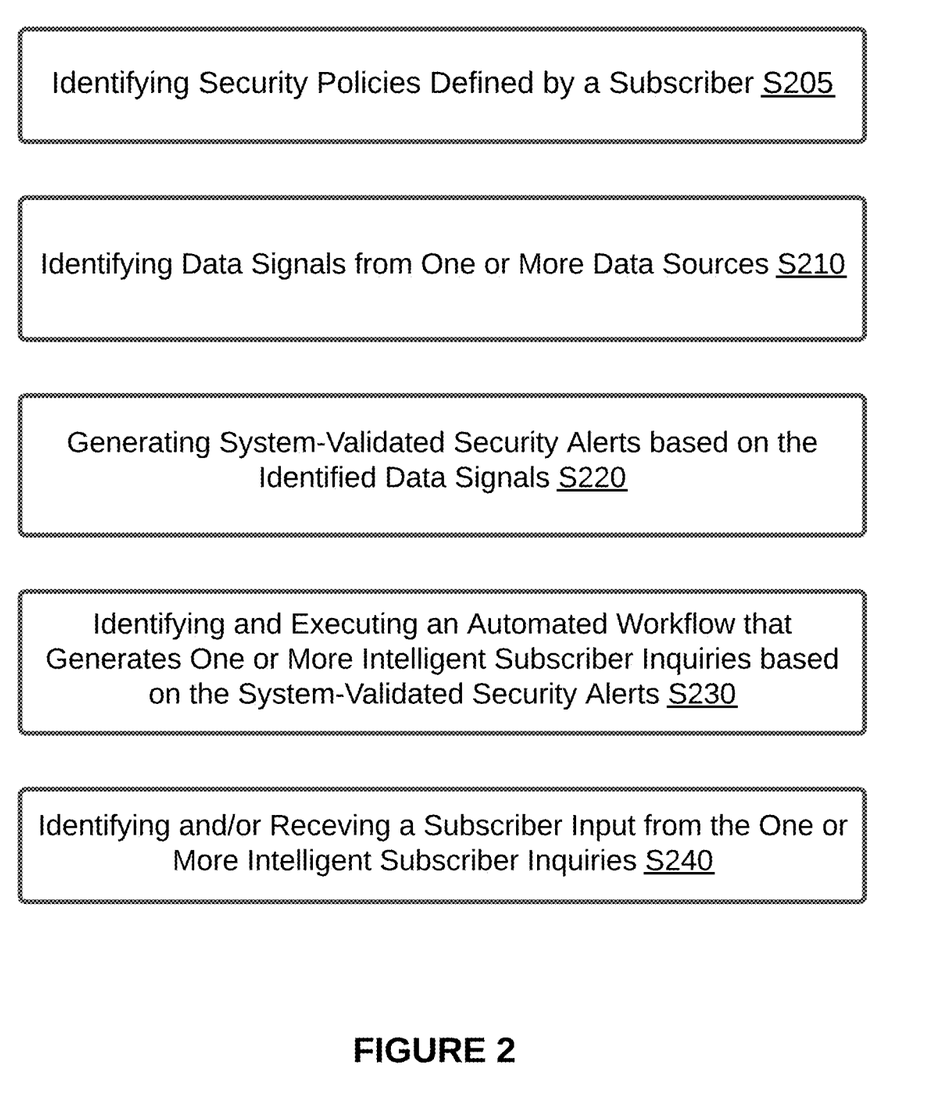
FIG. 2 illustrates an example method 200 in accordance with one or more embodiments of the present application.

2. Method for Automated Intelligent Verification of System-Validated Security Alerts or Cybersecurity Events Through Automated Workflows As shown in FIG. 2, a method 200 for automated intelligent verification of system-validated security alerts (or cybersecurity events) through automated workflows may include identifying security policies defined by a subscriber S205, identifying event data signals from one or more security data sources S210, generating system-validated security alerts based on the identified event data signals S220, identifying and executing an automated workflow that generates one or more intelligent verification messages based on the system-validated security alerts S230, and identifying and/or receiving a subscriber input (or subscriber response) to the one or more intelligent verification messages S240.

2.05 Identifying Subscriber Security Policies

S205, which includes identifying security policies defined by a subscriber, may function to implement (or configure) one or more subscriber security policies that may inform one or more security verification actions by the system 100 and/or the method 200. In one or more embodiments, a system (e.g., the system 100 implementing the method 200) may function to derive one or more parameters for automatically launching security verification messages or response-enabled verification communications (for a subscriber) based on the one or more subscriber security policies. As further described below, one or more subscriber security policies may be created external to the system (e.g., the system 100) and/or the method 200.

In one or more embodiments, for one or more subscriber security policies to be electronically understandable and/or electronically recognizable to the system 100 and/or the method 200, one or more of the subscriber security policies may include a plurality of security rules implemented (or configured) on the system 100 implementing the method 200. Additionally, or alternatively, interpreting one or more subscriber security policies to be understandable or recognizable to the system 100 and/or the method 200 may include creating, defining, outlining, and/or importing one or more security policies within the system 100 and/or the method 200.

In a first implementation, a system (e.g., the system 100) implementing the method 200, may function to identify one or more subscriber security policies and interpret characteristics of each subscriber security policy into one or more programmable security rules or heuristics and/or a plurality of programmable security rules or heuristics. In other words, in one or more embodiments of the first implementation, one or more characteristics of a target subscriber security policy may be transcribed into one or more (or a plurality of) programmable rules or heuristics understandable to the system 100 and/or the method 200. That is, the programmable rules may provide symmetry with (or align with) a manner in which the security policy governs the management of subscriber network resources and/or subscriber computing resources.

In a second implementation, a system (e.g., the system 100) implementing the method 200, may function to identify one or more subscriber security policies and interpret characteristics of the security policy via a security application programming interface (API) that may be programmatically integrated with both the system 100 implementing the method 200 and the one or more subscriber security policies. In other words, a subscriber implementing the security API may provide one or more security policies to a system or service implementing the method 200. It shall be noted that the security policy API may aid in governing and/or driving the management of the subscriber network resources and/or subscriber computing resources. In a non-limiting example, a subscriber implementing the security policy API may function to set one or more security policies for activating or initializing a verification via the cybersecurity service/system (e.g., system 100). In this non-limiting example, a verification service (e.g., one or more programmed verification computing servers) of a system implementing the method 200 may function to interface with the security policy API may function to identify one or more verification conditions that, if satisfied by attributes of detected cybersecurity alerts and/or cybersecurity event, would automatically cause an initialization of a verification of a target cybersecurity alert/event.

In a third implementation, a system (e.g., the system 100 implementing the method 200), may function to identify one or more subscriber security policies and interpret characteristics (or parameters) of the security policy via a security policy reference table. The security policy reference table may be initially created during an onboarding of a subscriber and periodically (or continuously or dynamically) updated/modified to maintain alignment with a current version of the subscriber security policy. It shall be noted that the security policy reference table may be accessible to the system 100 and/or the method 200 and/or a security analyst to aid in governing the management of the subscriber network resources and/or subscriber computing resources.

For example, in the first implementation, the second implementation, and/or the third implementation, one of the characteristics/parameters of the security policy may involve ensuring certain (or all) object storage (i.e., similar to file folders, store objects, metadata, or the like) is not accessible by the public (e.g., not accessible to non-authorized users). In the same or an alternative example, another characteristic/parameter of the security policy may involve ensuring certain outbound traffic parameters (i.e., eliminating outbound traffic originating from a subscriber environment) are appropriately defined for a respective security group (e.g., Security Group Egress Rule). Accordingly, in some embodiments, a subscriber-defined cybersecurity policy may define one or more communication transmission destination parameters for verification messages based on distinct types of cybersecurity events and/or distinct degrees (or threat levels) of cyber security events.

That is, the subscriber security policies (and in some embodiments the security rules) can define the security landscape (or security boundaries) for a subscriber environment, and such actions that deviate outside the boundary (or scope) of the security policy and/or security rules may trigger or cause an (e.g., event) data signal and/or a verification message (e.g., response-enabled verification communication) of the (e.g., event) data signal to a target communication destination of the subscriber.

2.10 Identifying Event Data Signals

S210, which includes identifying event data signals, may function to collect and/or receive event data signals from one or more distinct security data sources. In a preferred embodiment, the event data signals (i.e., unprocessed to the system 100 and generated by the one or more distinct security data sources) may relate to third-party alerts, event data, event logs, security policy alerts and/or activity data occurring with or involving internal computing networks or resources from a subscriber (e.g., one or more computing resources of the subscriber, one or more computer network resources of the subscriber, one or more data resources of the subscriber, one or more cloud-based resources of the subscriber, any computer accessible digital entity or device of the subscriber, and/or the like). In the same or alternative embodiments, the one or more data signals (e.g., event data, event logs, activity data, security policy alerts, third-party alerts, alerts, etc.) may provide a foundation (or base) to initiate intelligent verification messaging capabilities to a target subscriber.

In one or more implementations, the one or more distinct data sources may include one or more third-party web-based security services, one or more digitally-accessible subscriber security policies, and/or one or more digital services implemented/operating on one or more internal systems (or networks) of the subscriber. For example, S210 may function to periodically request or generate application programming interface (API) calls to each of the one or more distinct data sources for providing event data signals to the system (e.g., the system 100 implementing the method 200). Additionally, or alternatively, S210 may function to receive automatic pushes of (e.g., event) data signals from the one or more distinct security data sources to the system (e.g., the system 100) and/or the method 200. It shall be noted, in one or more embodiments, internal user activity and/or external third-party activity occurring within a subscriber environment that may deviate from an implemented (or identified) subscriber security policy may cause a security (e.g., event) data signal/security alert to be generated.

For instance, in one or more embodiments, an (e.g., event) data signal may be generated from a third-party application that may identify an Amazon Web Services (AWS) S3 Bucket being accessible to the public. In another non-limiting example, an (e.g., event) data signal may be generated from a third-party application that may identify an AWS Security Group permitting outbound traffic. In another non-limiting example, an (e.g., event) data signal may be generated from a third-party application that may identify an unexpected PowerShell usage. In yet another non-limiting example, an event data signal may be generated from a third-party application that may identify credential authentication (e.g., username and password) from a suspicious (or unexpected) country (i.e., atypical when compared with a "normal" user location). These non-limiting examples exemplify that one or more (e.g., event) data signals may be produced from one or more distinct (e.g., security) data sources based on unexpected and/or potentially suspicious activity.

It shall be recognized that the platform (or system) implementing the method 200 may be configured to receive, collect and/or identify any suitable signals from any available sources including, but not limited to, security data signals from third-party applications (e.g., third-party security applications), intricate data signals from external data enrichment sources, or the like.

It shall be further noted that the one or more identified (e.g., event) data signals that may be generated from one or more distinct (e.g., security) data sources may function to be in operable communication with and processed through an automated security alert engine (e.g., the security alert engine 110) that may create system-validated security alerts. That is, in some embodiments, S210 may function to identify data signals (e.g., third-party alerts, events/alerts, etc.) generated by one or more third-party (e.g., security) applications (utilized by a subscriber) that may be of a probable security threat and may also identify data signals that may not be of a likely security threat.

Additionally, in some embodiments, one or more identified data signals and/or the one or more security data alerts generated by the one or more distinct data sources (e.g., third-party applications) may provide insufficient details or lack information around the entire context or story of the one or more generated data signals. Therefore, at least one technical advantage of achieving more context and information involving the one or more identified data signals may include verification of the one or more data signals, as will be described in more detail herein. Accordingly, in one or more embodiments, S210 may preferably function to pass one or more data signals generated by the one or more distinct data sources to one or more (e.g., automated) downstream processes or operations that may initiate intelligent verification messages to the subscriber.

2.2 Generating System-Validated Security Alerts

S220, which includes generating system-validated security alerts, may function to automatically pass identified data signals provided by S210 through an automated security alert engine to generate and/or prioritize system-validated security alerts, as described in U.S. patent application Ser. No. 17/488,800, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM, which is incorporated in its entirety by this reference. In a preferred embodiment, S210 may function to implement an automated security alert engine that may automatically ingest (e.g., event) data signals identified by S210, process the (e.g., event) data signals, and generate and/or publish one or more system-validated security alerts based on the processing of the (e.g., event) data signals. It shall be noted that, in one or more embodiments, the automated security alert engine may function to retrieve identified (e.g., event) data signals via a data signal application programming interface (API) server or the like.

In one or more embodiments, the automated security alert engine may be in web-based communication or any other known electronic communication with a plurality of distinct data sources. In some embodiments, the plurality of distinct data sources may be the subject of cybersecurity protection sought by the subscriber implementing the system 100 and/or the method 200. For example, the system (e.g., the system 100) and, in particular, the automated security alert engine implementing the method 200 may function to receive a large volume (e.g., exceeding a threshold value) of (e.g., event) data signals from (or generated from) the plurality of distinct data sources via any known API method, web-based communication method, or the like.

It shall be further noted that based on receiving (and/or identifying and/or ingesting) one or more data signals, S220 may function to distill, rank, triage, and/or filter the one or more data signals (generated from the plurality of distinct data sources) into one or more system-validated security alerts via the automated security alert engine. A system-validated security alert, as referred to herein, may generally relate to one or more identified data signals that may have been processed through the automated security alert engine (e.g., the security alert engine no) and published/identified by the system (e.g., the system 100) and/or the method 200 as valid (e.g., not a false-positive, initially appears to be a security threat, initially appears to look malicious, etc.).

Additionally, or alternatively, in one or more embodiments, S220 may function to distill, rank, triage, and/or filter large volumes of data signals (e.g., a plurality of data signals) generated from the plurality of distinct data sources into smaller subsets of system-validated security alerts based on one or more system security escalation criterions, one or more subscriber security escalation criterions, one or more security event criterions, one or more system alert labels (e.g., type of attack activity, type of severity, type of attack vector, type of alert, type of threat, etc.), and/or one or more security alert validations.

2.2.1 Rules Based-Informed Automated Security Alert Engine

In a first implementation, the automated security alert engine comprises a plurality of distinct, predetermined security threat identification heuristics or rules that govern the operations of the automated security alert engine. For example, the security event criterion and/or the system alert labels (e.g., type of attack activity, type of attack severity, type of attack vector, type of alert, type of threat, etc.), may be determined by a plurality of distinct, predetermined security threat identification heuristics or rules that govern the operations of the automated security alert engine.

That is, one or more of the identified data signals (along with its respective attributes and/or corresponding characteristics) inputted into and/or accessed by the automated security alert engine may be evaluated against predetermined security threat identification heuristics or rules capable of detecting and/or mapping the one or more inputted (e.g., event) data signals to a respective automated workflow (e.g., automated verification workflow, automated investigation workflow, etc.) based on an associated security activity label type (e.g., electronic messaging compromise label, phishing label, suspicion login label, ransomware label, malware label, etc.) of a respective system-validated security alert. Additionally, or alternatively, the one or more of the identified data signals (along with its respective attributes and/or corresponding characteristics) inputted into and/or accessed by the automated security alert engine may be evaluated against predetermined security threat identification heuristics or rules capable of detecting and/or mapping the one or more inputted (e.g., event) data signals to a respective automated workflow based on a probable degree of threat severity of a subject cybersecurity event.

For example, in accordance with a determination that the automated security alert engine (e.g., the rules based-informed automated security alert engine) detects a type of security activity and/or type of security severity level, S220 may function to convert (or generate) the identified data signal of S210 into a system-validated security alert and pass and/or route the system-generated alert (e.g., the system-validated security alert) to one or more downstream processes (e.g., to an automated security investigation engine 120 or to an automated verifications engine). That is, in some embodiments, the automated security alert engine may function to automatically determine for one or more inputted (and/or identified) data signals whether or not the one or more data signals appears to be malicious and/or the type of security activity (or threat) type (e.g., electronic messaging compromise, phishing, suspicion login, ransomware, malware, etc.), and may also cause an activation of an automated downstream workflow.

2.2.2 Machine Learning—Informed Automated Security Alert Engine

In a second implementation, the security alert engine comprises one or more security alert machine learning classifiers designed and trained to identify validated security alerts and non-security alerts. In such implementation, S220 may function to implement one or more security machine learning models that may classify each distinct, inbound data signal of the plurality of data signals as either a validated security alert or a non-security alert based on security feature characteristic data associated with each security alert. In operation, S220 implementing the automated machine learning security alert engine may function to analyze the security alert engine and generate a security alert machine learning engine. For example, based on the features and attributes of the data signal, the automated machine learning security alert engine may function to calculate and output a security alert machine learning label having the highest probability of matching a target (e.g., event) data signal or a target system-validated security alert.

Additionally, or alternatively, S220 may function to implement a feature extractor or a feature extractor system that may function to extract a feature dataset from each inbound security alert that may be used as input into the one or more security machine learning models. Accordingly, in such embodiments, the one or more machine learning models computing against a given feature dataset of a subject security alert may function to output a classification label for the subject security alert (that identifies the subject security alert as a valid security alert) to be set for an investigation and/or a verification (or an invalid security alert to be discarded, ignored, or passed through a less stringent investigation procedure by a service or system (e.g., system 100) implementing the method 200).

In one or more embodiments, in accordance with a determination that the first implementation and/or the second implementation of the automated security alert engine determines that one or more of the inputted data signals of S210 may be malicious, the system (e.g., the system 100) implementing the method 200 may automatically promote the respective data signal (and now referred to as a system-validated security alert) to one of an investigation-level, verification-level, or incident-level based on the severity and/or activity type (e.g., attack vector type, type of activity, type of threat or the like).

For example, S220 may function to pass one or more system-validated security alerts automatically produced by the security alert engine to one or more downstream processes or operations (e.g., S230-S240) that preferably includes utilizing an automated investigations engine and/or an automated verifications engine to trigger (or cause) an activation of an automated investigation workflow and/or an automated verification workflow, respectively.

Additionally, or alternatively to the implementations of the rules based-informed automated security alert engine and/or the machine learning-informed automated security alert engine, it shall be recognized that the first implementation and/or the second implementation of the automated security alert engine may generate one or more system-validated security alerts, such that the one or more system-validated security alerts may be compared (or cross-referenced) against the subscriber security policy to identify whether verification messages (or verification communications or response-enabled verification communications) may be needed, as described in more detail below.

2.3 Identifying and Executing an Automated Workflow that Generates One or More Response-Enabled Verification Communications|Verify Actions S230, which includes identifying and executing an automated workflow, may function to identify and execute an automated workflow that, when executed by the cybersecurity event detection and response service, may cause an automatic construction and transmission of one or more response-enabled verification communications (may also be referred to herein as "intelligent subscriber inquiry" or "intelligent verification message" or "intelligent verification communication") to a target subscriber of a target system-validated security alert. In a preferred embodiment, S230 may function to automatically execute one or more automated workflows (e.g., an automated verification workflow, an automated investigation workflow, or the like) based on one or more characteristics of a subject system-validated security alert, such as (but not an exhaustive list of), a likely or probable computed threat type of a target system-validated security alert, a likely or probable computed degree of threat severity of a target system-validated security alert (e.g., a likely or probable computed degree of threat severity may be set between any two values in a range, such as a value including and/or between 0 and 100 or A to Z and the like, which may inform a degree of threat risk associated with a target validated security alert.

In some embodiments, one or more automated workflows (e.g., one or more automated verification workflows, one or more automated investigation workflows, etc.) may be configured according to a subscriber security policy provided by S205. Thus, in some embodiments, system-validated security alerts or cybersecurity events that may be occurring in a subscriber environment, and that may be deviating outside of the security policy may cause or trigger an execution of an automated verification workflow that may construct and transmit a response-enabled verification communication to a target subscriber corresponding to a subject system-validated security alert or cybersecurity event. It shall be noted that activity causing the system-validated security alert or cybersecurity event may be associated with internal subscriber user activity and/or external third-party activity, and thus, an automated investigation workflow may be executed based on internal user activity or external third-party activity.

Accordingly, in one or more embodiments, an automated workflow may include one or more verification conditions, one or more verification criteria, one or more verification rules or specific processes for governing a construction and transmission of a response-enabled verification communication (or verification message) to a target subscriber. In other words, an automated workflow may include one or more security verification evaluation parameters that may relate to a criterion and/or a condition that may be used in an evaluation of a system-validated security alert or cybersecurity event associated with a subscriber. In one example, an automated workflow may include one or more verification evaluation parameters (e.g., verification-initiation criteria), such as a time-of-day criterion, a cybersecurity event-type criterion, a threat severity level criterion, a threat severity level criterion, and any other verification evaluation criterion.

Automated Verification Workflows

Figure 4:
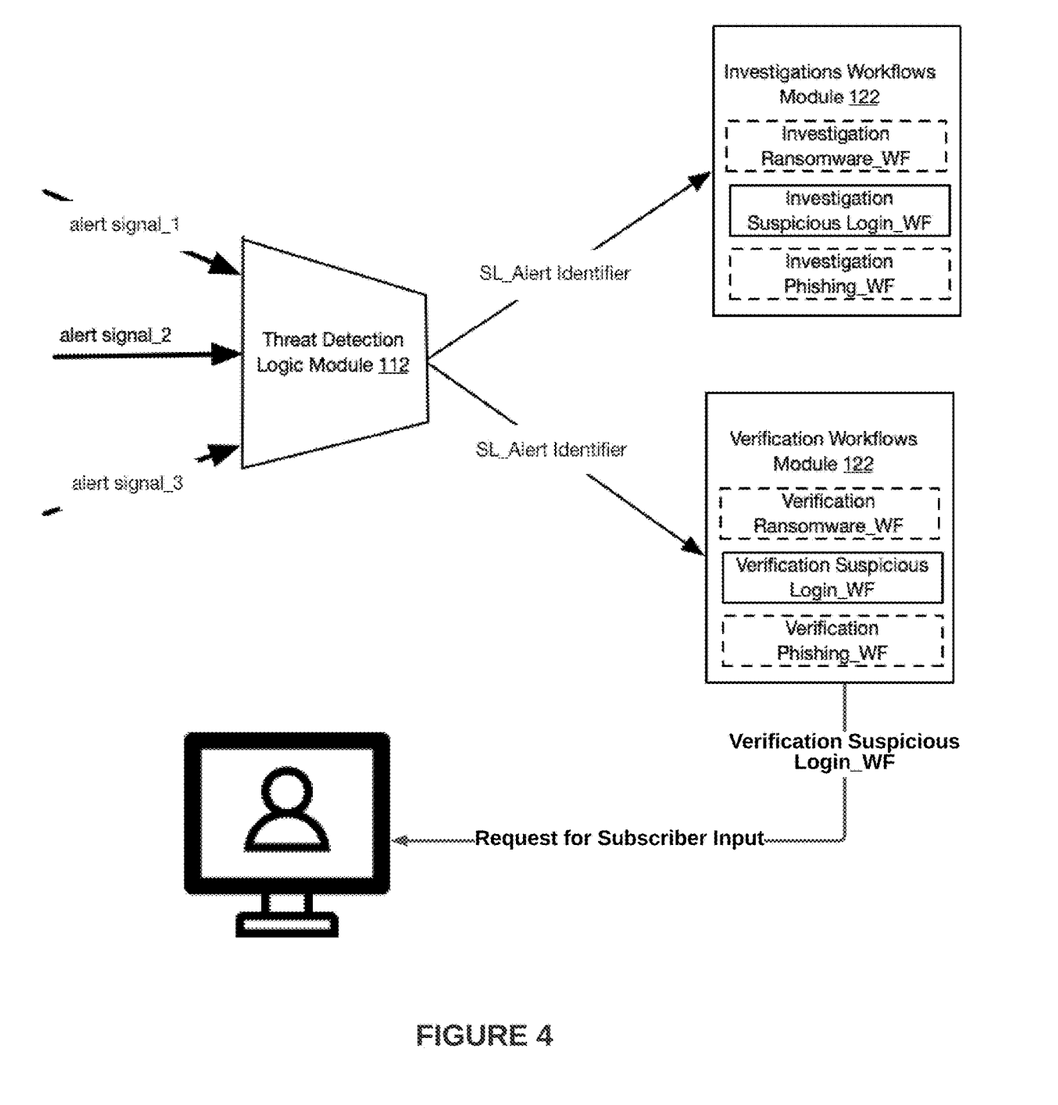
FIG. 4 illustrates an example schematic for implementing portions of a method 200 and a system 100 in accordance with one or more embodiments of the present application.

In one or more embodiments, an automated verification workflow that, when executed, may function to automatically construct, and transmit a response-enabled verification communication (e.g., intelligent subscriber inquiry) to a target subscriber associated with a subject system-validated security alert or subject cybersecurity event. In one or more embodiments, an automated verification workflow may be executed based on evaluating characteristics or features of the system-validated security alert against verification-initiation criterion (e.g., time-of-day criterion, threat severity level criterion, system-validated alert type criterion, etc.) of the automated verification workflow, as schematically shown by way of example in FIG. 4. Accordingly, as described in more detail below, a response-enabled verification communication template may be digitally linked or digitally mapped to a target automated verification workflow via a template identification (e.g., template ID).

Accordingly, in response to executing an automated verification workflow, the automated verification workflow may function to source and/or instantiate a response-enabled verification communication template that may be digitally linked to the automated verification workflow via a template identification, and S240 may function to construct a response-enabled verification communication by selectively installing system-validated security alert data of the system-validated security alert into the response-enabled verification communication template. Accordingly, the constructed response-enabled verification communication may be transmitted to a target subscriber of the system-validated security alert via one or more bi-directional third-party messaging channels and/or to the security mitigation user interface 130.

In a first implementation, a system (e.g., the system 100 implementing the method 200) may function to automatically and selectively execute one or more automated verification workflows from a plurality of automated verification workflows in response to detecting a system-validated security alert (or a cybersecurity event) of a target alert type (e.g., target alert threat type, target alert name, etc.). For example, the system 100 and/or the method 200 may function to automatically execute a suspicious login verification workflow that may include a construction and transmission of a response-enabled verification communication based on (or in response to) detecting or identifying an (e.g., inbound) system-validated security alert of a target alert type (e.g., a Suspicious Login Alert Type) that may be based on a location-based event data signal (e.g., Geolocated Office365 Login Signal). In such example, executing a suspicious login verification workflow may not necessarily represent that the user account may be compromised, but rather the verification message or the response-enabled verification communication (and more specifically the subscriber input or subscriber response received back from the verification message) may provide a capability for the system and/or the method 200 to access (or tap into) first-hand knowledge or information from the subscriber (e.g., organizational entity) regarding the observed, unexpected user activity of the identified system-validated security alert that may not be readily known to the system 100 and/or the method 200.

It shall also be noted, in the first implementation, that each of the plurality of automated verification workflows may be preconfigured or pre-programmed for a distinct system-validated security alert type, a distinct system-validated security alert threat type, a distinct system-validated security alert name, and/or the like. In other words, each of the plurality of automated verification workflows may be distinctly mapped or electronically associated with a distinct alert type and/or alert name, and/or threat type of a system-validated security alert such that a detection of the distinct security alert type and/or security alert name and/or threat type may cause a selection and/or an automatic launching of a corresponding automated verification workflow.

In a second implementation, a system (e.g., the system 100 implementing the method 200) may function to automatically (e.g., selectively) execute one or more automated verification workflows from a plurality of automated verification workflows in response to detecting an (e.g., inbound) system-validated security alert (or a cybersecurity event) of a target threat severity level. For example, the system 100 and/or the method 200 may function to automatically execute an automated verification workflow (that may include a constructing and transmission of a response-enabled verification communication) based on (or in response to) detecting or identifying a system-validated security alert exceeding a target threat severity level threshold. In such example, the verification message or the response-enabled verification communication may provide the capability for the system and/or the method 200 to access (or tap into) first-hand knowledge or information from the subscriber (e.g., organizational entity) regarding the observed activity of the identified system-validated security alert.

In a third implementation, a system (e.g., the system 100) implementing the method 200 may function to automatically execute one or more verification workflows from a plurality of automated verification workflows in response to detecting a distinct system-validated security alert. In the third implementation, the system 100 and/or the method 200 may be configured to initiate a data gathering/data collection technique to preferably analyze and/or develop observations based on the system-validated security alert. Accordingly, based on the analysis and/or findings, one or more automated verification workflows comprising a verification message (that is configured to receive subscriber input) may be executed. In this third implementation, the one or more automated verification workflows may exist independent of the automated investigation workflows (described in more detail below) and in some embodiments, may only be triggered if the investigative details or circumstances surrounding a security alert satisfy conditions or requirements for automatically launching the automated verification workflow.

For example, in such implementation, S230 may function to identify a system-validated security alert (e.g., Login with Suspicious User-Agent String Alert) based on an identified data signal (e.g., Geolocated Office 365 Login Signal). In response to identifying the system-validated security alert (e.g., Login with Suspicious User-Agent String Alert), the system 100 and/or the method 200 (e.g., S230) may be configured to analyze and/or observe one or more characteristics of the system-validated security alert and/or the activity associated with the system-validated security alert occurring within an environment of the subscriber. Thereafter, in accordance with a determination that the analysis and/or observations by the system 100 and/or the method 200 determines unexpected system and/or user behavior, S230 may execute a verification workflow that may include a verification message (or response-enabled verification communication) to the subscribing entity.

Stated differently, S230 may function to receive system-validated security alerts, and automatically compare (or cross-reference) the security policy of the subscriber for identifying whether verification may be needed for any of the activities that triggered (or caused) the one or more system-validated security alerts.

It shall be noted that in the first implementation, the second implementation, and/or the third implementation, the verification message (or response-enabled verification communication) may be routed (e.g., electronically transmitted) to a non-affected (e.g., unbiased or impartial) party or administrator (e.g., different department, different user, Information Technology (IT) department, computer-based administrator, an analyst, or the like) of the subscribing entity that may not be (e.g., directly) associated (or involved) with the system-validated security alert (e.g., not user123@company123.com). That is, the intelligent verification message of the automated verification workflow may provide the ability for the system 100, the method 200, and/or an analyst to access (or tap-into) knowledge and/or unbiased information known to the subscriber, but not readily apparent to the system 100 (e.g., the subscriber or administrator may know when a user may be traveling outside of a "home location" or known user geographical location, but the cybersecurity event detection and response service may not).

Analyst-Initiated Verification Workflows

In one or more embodiments, a security analyst of the cybersecurity event detection and response service may function to execute (or initiate or trigger) one or more automated verification workflows that may automatically construct and/or system-generate a response-enabled verification communication (e.g., a verification message, an intelligent subscriber inquiry) to a target subscriber in response to the analyst triggering (or initiating or executing) the one or more automated verification workflows (e.g., the automated verification workflow does not execute until the security analysts performs an action indicating that a verification of a cybersecurity event or system-validated security alert is needed). An analyst-initiated response-enabled verification communication as generally described herein, may include a type of verification message, type of verification alert, type of verification notification, and/or combinations thereof that seeks (or requests) a subscriber to verify (or confirm) activity that may be occurring/have occurred within the environment of the subscriber based on a security analyst of the cybersecurity event detection and response service initiating or causing an execution of an automated verification workflow.

In a first implementation, a security analyst may initiate or cause an execution of an automated verification workflow for a target cybersecurity event (or system-validated security alert) at any time, for instance, during a (e.g., pending) cybersecurity investigation, before a cybersecurity investigation, after identifying a cybersecurity event provided by S210, and/or after identifying a system-validated security alert provided by S220. For instance, in a non-limiting example, a security analyst may be reviewing, observing, and/or investigating a target system-validated security alert and may opt to selectively execute an automated verification workflow of a plurality of automated verification workflows that may system-generate or automatically construct a verification message (e.g., response-enabled verification communication) based on one or more characteristics of the system-validated security alert and/or investigative findings during the course of a cybersecurity investigation.

In a second implementation, based on identifying a plurality of system-validated security alerts, the system 100 and/or the method 200 may (e.g., selectively) system-generate one or more verification prompts that may correspond to one or more distinct system-validated security alert of the plurality of system-validated security alerts. In one or more embodiments of such implementations, the one or more verification prompts may be displayed (to a security analyst) on a security mitigation user interface (e.g., Workbench) and may be selectable by the security analyst.

Accordingly, in response to a selection by a security analyst selecting one of the one or more verification prompts, the system implementing the method 200 may function to execute an automated verification workflow that may automatically construct and electronically transmit a response-enabled verification communication to a target subscriber. It shall be noted that the verification prompt may be a system-generated variable interface object that may be persistently available during a (e.g., pending) cybersecurity investigation to verify (or confirm) one or more findings based on the current state of the investigation and/or one or more characteristics of the system-validated security alert. It shall be further noted that the verification prompt may identify and/or suggest and/or prompt and/or recommend to the security analyst to execute an automated verification workflow based on one or more characteristics of the system-validated security alert or investigation findings.

In one or more embodiments of the first implementation and/or the second implementation, the verification message (or response-enabled verification communication) may be routed (e.g., electronically transmitted via one or more computers) to a non-affected (or unbiased or impartial) party or administrator (e.g., different department, different user, Information Technology (IT) department, computer-based administrator) of the subscribing entity that may not be (e.g., directly) associated (or involved) with the system-validated security alert (e.g., not user123@company123.com). Stated differently, the intelligent verification message of the automated verification workflow may provide an ability for the system 100, the method 200, and/or an analyst to access (or tap-into) knowledge and/or unbiased information known to the subscriber, but not readily apparent to the system (e.g., the subscriber or administrator may know when a user may be traveling outside of a "home location" or known user geographical location, but the cybersecurity event detection and response service may not).

Additionally, or alternatively, in one or more implementations of the analyst-initiated workflow or the automated verification workflow, the output of the verification message (also may referred to as subscriber response), may cause the system 100 and/or the method 200 to escalate (e.g., promote) or de-escalate (e.g., demote) the threat severity level of the system-validated security alert (or cybersecurity event). Additionally, or alternatively, based on the subscriber response (e.g., subscriber input) to the verification message, S230 may function to initiate (or automatically cause) an automated investigation workflow to be executed, as described in U.S. patent application Ser. No. 17/488,800, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM, which is incorporated in its entirety by this reference. It shall be noted, in one or more embodiments, after a temporal threshold has been exceeded and the subscriber has not responded or given input to the intelligent verification message (e.g., response-enabled verification communication), an automated (cybersecurity) investigation workflow may be initiated.

Automated Investigation Workflows Including Intelligent Verification Messages

In one or more embodiments, S230 may function to automatically execute one or more automated investigation workflows for automatically handling one or more portions of a cybersecurity investigation of a subject system-validated security alert or cybersecurity event. An automated investigation workflow may comprise a sequence and/or a collection of distinct investigative actions, distinct investigative queries, and/or investigative subroutines, that when executed, automatically queries and/or probes one or more of the relevant distinct data sources of a target subscribing entity and/or automatically probes a subscriber for further information (e.g., investigation findings data). The collection of investigative actions, investigative queries, and/or investigative subroutines may be preprogrammed (and/or automated) investigation requests according to a respective automated investigation workflow (e.g., phishing workflow, suspicion login workflow, ransomware workflow, malware workflow, etc.) to provide greater context and/or explanations to the overall story of the system-validated security alert. In other words, an automated investigation workflow that, when executed, may (e.g., automatically) construct and/or system-generate one or more automated investigative actions to one or more of a plurality of distinct data sources of a target subscriber based on preprogrammed (and/or automated) requests of the one or more automated investigation workflows and may optionally include an automated verification action (e.g., a construction and transmission of a response-enabled verification communication).

Accordingly, in one or more embodiments, one or more (e.g., automated) investigative actions of an automated investigative workflows may include an intelligent subscriber inquiry (e.g., a verification message). In other words, the one or more intelligent subscriber inquiries may define an integral part of a broader automated investigation workflow and in some embodiments, may only be triggered if the investigative details or circumstances surrounding a security alert or event satisfy conditions or requirements for automatically launching a verification component or verification automation (i.e., the automated verification workflow) of the automated investigation workflow.

It shall be noted that, in one or more embodiments, a subset of automated investigation workflows of a plurality of distinct automated investigation workflows may not include a verification component or verification automation. In operation, a distinct automated investigation workflow may be defined for each recognizable or distinct classification type (or attack vector or activity type) of a system-validated security alert that may or may not be configured for one or more verification actions. That is, in some embodiments, each class or distinct type of system-validated security alert may be digitally mapped or electronically linked to a distinct automated investigation workflow that may or may not be configured for one or more intelligent subscriber inquiries (e.g., one or more verification messages).

For example, a first system-validated security alert type (or threat severity level) may be mapped to a first automated investigation workflow and a second system-validated security alert type (or threat severity level) may be mapped to a second automated investigation workflow, such that each of the first automated investigation workflow and the second automated investigation workflow are configured to automatically execute and perform investigative tasks for efficient analysis, probing, or investigation of the system-validated security alert. In this example, the first executed automated investigation workflow may trigger or cause an intelligent verification message and the second executed automated investigation workflow may not trigger or cause an intelligent verification message. That is, the verification message may be only configured for predetermined types of activity, predetermined types of subscribers, predetermined time ranges of the activity type, unexpected actions, predetermined investigation workflows, etc.

In operation, the system 100 and/or the method 200 may function to implement a multi-stage cybersecurity investigation that includes a plurality of cybersecurity investigation stages for a subject cybersecurity event. In such embodiments, the multi-stage cybersecurity investigation may include executing, at a first investigation stage, one or more automated cybersecurity investigation workflows based on a probable cybersecurity threat type of the cybersecurity event. Additionally, in one or more embodiments of the multi-stage cybersecurity investigation, the multi-stage cybersecurity investigation may include transmitting, at a second investigation stage, a response-enabled verification communication to the subscriber of the cybersecurity event that includes a request for a subscriber response to the response-enabled verification, and while awaiting the subscriber response to the response-enabled verification communication temporarily suspending the multi-stage cybersecurity investigation pending the subscriber response. Additionally, in one or more embodiments of the multi-stage cybersecurity investigation, the multi-stage cybersecurity investigation may include restarting, at a third investigation stage, the temporarily suspended multi-stage cybersecurity investigation based on identifying the subscriber response to the response-enabled verification communication and automatically routing the cybersecurity event to one of a cybersecurity threat escalation route and a cybersecurity threat de-escalation route based on the subscriber response.

Composition of a Verification Message|Construction of a Response-Enabled Verification Communication In one or more embodiments, a response-enabled verification communication may be (e.g., automatically) constructed by one or more computers based on one or more features of a cybersecurity event (or system-validated security alert) satisfying verification-initiating criteria of an automated workflow, as mentioned above. A response-enabled verification communication, as generally referred to herein, may be constructed to include a request for a subscriber response to the response-enabled verification communication to either confirm or not confirm activity associated with a subject cybersecurity event (or system-validated security alert). In other words, the response-enabled verification communication may be constructed to include one or more pieces of event-descriptive content that may include event-specific characteristics or event-specific features of a subject cybersecurity event and include a request or capability for a subscriber (e.g., organizational entity) to verify (and/or confirm) whether (e.g., event) activity (e.g., user activity, security policy changes, login activity, etc.) associated with the subscriber is valid (e.g., authorized) or not (e.g., not authorized) based on the one or more pieces of event-descriptive content included in the response-enabled verification communication.

In a first implementation, a response-enabled verification communication may be constructed based on a response-enabled verification communication template that may be defined for each recognized and/or distinct threat type classification or category of system-validated security alerts. A response-enabled verification communication template, as generally referred to herein, may be a subscriber-facing communication template that may be configured to uniformly communicate to a target subscriber regarding potentially malicious/suspicious behavior for a distinct classification or category of a system-validated security alert and/or perform one or more digital event verification actions. For instance in a non-limiting example, a first distinct response-enabled verification communication template may be configured for a first system-validated security alert type or classification or name (e.g., user granted admin role), a distinct second response-enabled verification communication template may be configured for a second system-validated security alert type or classification or name (e.g., suspicions login), and a distinct third response-enabled verification communication template may be configured for a third system-validated security alert type or classification or name (e.g., AWS Security Rule was added to allow outbound traffic).

In one or more embodiments, the one or more pieces of event-descriptive content that may be included in a response-enabled verification communication template may be based on the distinct classification or category or name of a system-validated security alert. In one example of a response-enabled verification communication template, the response-enabled verification communication template may include one or more text-based event specific pieces of content and/or one or more graphical-based event specific pieces of content. It shall be noted that in one or more embodiments, one or more distinct regions of a response-enabled verification communication template may be encoded and/or digitally mapped to one or more graphical content automations and/or one or more textual content automations that, when executed, installs selective attributes or features or characteristics of a target system-validated security alert (or a target cybersecurity event) into the one or more distinct regions of the response-enabled communication template, as described in U.S. patent application Ser. No. 17/591,185, titled SYSTEMS AND METHODS FOR CYBER SECURITY THREAT DETECTION AND EXPEDITED GENERATION OF INVESTIGATION STORYBOARDS USING INTELLIGENT CYBER SECURITY AUTOMATIONS, which is incorporated in its entirety by this reference Additionally, in one or more embodiments, the response-enabled verification communication template (e.g., intelligent subscriber inquiry) may be constructed to include one or more digitally selectable interface objects that may enable a subscriber (e.g., organizational entity) to indicate whether one or more characteristics associated with the system-validated security alert (or cybersecurity event) is either expected or unexpected activity (e.g., Authorized/Not Authorized, Yes/No, or any other suitable digitally selectable objects that provides a binary verification capability). Additionally, or optionally, in one or more embodiments, the response-enabled verification communication template (e.g., the intelligent subscriber inquiry) may be constructed to include a message (or text) box that may enable a subscriber to input textual data (e.g., cybersecurity (e.g., event) handling instructions, one or more unstructured text strings of cybersecurity handling instructions, etc.) that may cause an update to a cybersecurity (event) policy of the subscriber, and thus, a future operating mode of the cybersecurity event detection and response service for the subscriber.

Figure 3:
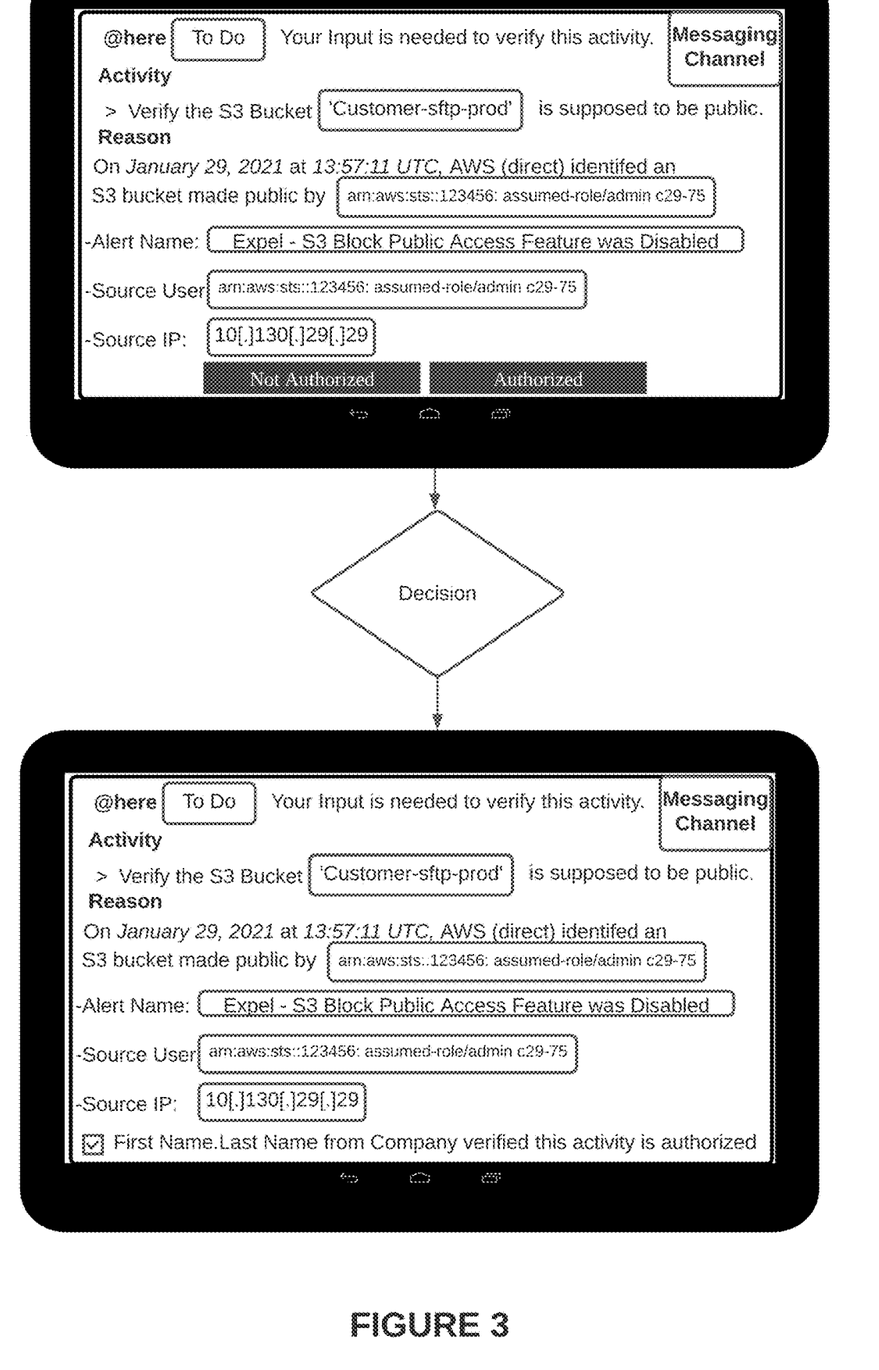
FIG. 3 illustrates an example response-enabled verification communication process in accordance with one or more embodiments of the present application.

Additionally, in one or more embodiments, a constructed response-enabled verification communication (e.g., intelligent subscriber inquiry, intelligent verification message, or the like) may include one or more details/attributes/properties of a subject system-validated security alert (or cybersecurity event), including (but not an exhaustive list of) the third-party alert name, the third-party alert description, the system-validated security alert type, the source user, the source internet protocol (IP) address, the name of the process, the name of the host, the file hash, the activity and/or the reason for the system-validated security alert, etc., as shown generally by way of example in FIG. 3.

Transmission of a Verification Message|Transmission of a Response-Enabled Verification Communication It shall be noted that a constructed response-enabled verification communication may be (e.g., electronically) transmitted to a target subscriber via one or more communication services/channels (e.g., one or more bi-direction communication channels, one or more bi-directional third-party messaging channels, a plurality of bi-directional communication channels, and the like) or similar interfaces (e.g., Microsoft Teams, Slack, Email, PagerDuty, the Security Mitigation User Interface, etc.) to initiate a request to a subscriber to verify whether activity associated with the system-validated security alert of the subscriber is or is not valid.

Additionally, or alternatively, in one or more embodiments, a constructed response-enabled verification communication or intelligent subscriber inquiry (e.g., intelligent verification message) may be transmitted to a digital verification queue of the cybersecurity event detection and response service. In such embodiments, a representation of the digital verification queue of the cybersecurity event detection and response service may be displayed on a web-based user interface of the cybersecurity event detection and response service that may be accessible by a target subscriber. Accordingly, a subscriber may interact with the web-based user interface to display one of a plurality of response-enabled verification communications that may be displayed on the web-based user interface, and while displaying the one of the plurality of response-enabled verification communications, the system 100 implementing the method 200 may function to identify or receive a subscriber response (e.g., subscriber input) that may confirm or not confirm the system-validated security alert or cybersecurity event.

2.4 Identifying Subscriber Responses to Response-Enabled Verification Communications S240, which includes identifying subscriber responses to response-enabled verification communications, may function to identify a subscriber response to a response-enabled verification communication that may govern a threat escalation decision or a threat disposal decision for a subject system-validated security alert. In a preferred embodiment, based on a receipt of a subscriber response (e.g., identifying or collecting a subscriber response) to one or more response-enabled verification communications (e.g., one or more intelligent subscriber inquires, one or more verification messages), S240 may function to identify and/or determine a cybersecurity routing decision for a target system-validated security alert (or cybersecurity event) associated with the response-enabled verification communication.

In one or more embodiments, S240 may function to intelligently route a cybersecurity event to a cybersecurity threat escalation route of the cybersecurity threat detection and response service based on a subscriber response to a response-enabled verification communication involving the cybersecurity event (or system-validated security alert). In such instance, in response to S240 identifying a subscriber response to a response-enabled verification communication as not authorized (e.g., a subscriber selection of a "not authorized" selectable interface object included in a response-enabled verification communication), S240 may function to escalate the system-validated security alert corresponding to the response-enabled verification communication to an investigation level. In some embodiments, S240 may function to escalate the system-validated security alert to an incident level and transmit the system-validated security alert to an incident queue.

Accordingly, in one or more embodiments of routing the target cybersecurity event to a threat escalation route, the system 100 and/or the method 200 may function to launch a cybersecurity investigation and/or (e.g., automatically) suggest remediation actions to mitigate a cybersecurity threat. In other words, via executing one or more cybersecurity threat mitigation actions, a cybersecurity threat associated with the cybersecurity event may be mitigated based on identifying a subscriber response to the response-enabled verification communication as "not authorized".

In one or more embodiments, S240 may function to intelligently route a cybersecurity event to a cybersecurity threat de-escalation route of the cybersecurity threat detection and response service based on a subscriber response to a response-enabled verification communication involving the cybersecurity event. In such instance, in response to S240 identifying a subscriber response to the response-enabled verification communication as authorized (e.g., a subscriber selection of an "authorized" selectable interface object included in the response-enabled verification communication), S240 may function to de-escalate the system-validated security alert corresponding to the response-enabled verification communication. Additionally, or alternatively, in response to S240 identifying a subscriber response to the response-enabled verification communication as authorized (e.g., a subscriber selection of an authorized selectable interface object included in the response-enabled verification communication), S240 may function to route the system-validated security alert for disposal and/or to a disposal queue.

It shall be noted that intelligently routing (e.g., escalating or de-escalating the system-validated security alert) may be determined (and/or identified) by an analyst or automatically determined by the system implementing the method 200 based on (e.g., after receipt) of the subscriber response to the response-enabled verification communication (e.g., intelligent subscriber inquiry, intelligent verification message, etc.). The subscriber response to a corresponding response-enabled verification communication may be used to support and/or enable one or more intelligent downstream routing decisions including, but not limited to, escalating the system-validated security alert, de-escalating the system validated security, causing an initialization of one or more cybersecurity investigations for resolving one or more cybersecurity threats that may include potentially compromised computing systems and/or computing resources.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for verification-informed handling of cybersecurity activity, the method comprising:
   at a cybersecurity event detection and response service:
   attributing, by one or more computers, a service-computed threat severity level to a target cybersecurity event;
   constructing, by the one or more computers, a cybersecurity threat verification communication based at least on the service-computed threat severity level, wherein the cybersecurity threat verification communication includes:
   (a) one or more pieces of threat-informative content based on data associated with the target cybersecurity event;
   (b) a first selectable interface object that, when selected, provides an indication that the target cybersecurity event relates to a cybersecurity incident; and
   (c) a second selectable interface object that, when selected, provides an indication that the target cybersecurity event relates to a valid cybersecurity event;
   selectively identifying a communication transmission destination for the cybersecurity threat verification communication from a plurality of distinct communication transmission destinations based on a subscriber-defined cybersecurity policy and the threat severity level, wherein the subscriber-defined cybersecurity policy defines a distinct communication transmission destination of the plurality of distinct transmission destinations for each of distinct threat severity level of a plurality of distinct service-computed threat severity levels;
   transmitting, by the one or more computers, the cybersecurity threat verification communication based on the construction of the cybersecurity threat verification communication and the identification of the communication transmission destination;
   updating, by the one or more computers, a threat severity level of the target cybersecurity event based on identifying an input selecting the first selectable interface object or the second selectable interface object of the cybersecurity threat verification communication; and
   routing the target cybersecurity event to one of:
   a cybersecurity threat escalation route of the cybersecurity event detection and response service based on identifying the input selecting the first selectable interface object, the cybersecurity threat escalation route comprising a cybersecurity incident queue; and
   a cybersecurity threat de-escalation route of the cybersecurity event detection and response service based on identifying the input selecting the second selectable interface object, the cybersecurity threat de-escalation route comprising a cybersecurity event disposal queue.

2. The method according to claim 1, further comprising:
based on a time span between the transmitting of the cybersecurity threat verification communication and the identifying the input exceeding a temporal threshold:
   executing an automated cybersecurity investigation workflow that derives cybersecurity threat intelligence data associated with the target cybersecurity event based on a probable cybersecurity threat type of the target cybersecurity event.

3. The method according to claim 1, wherein:
the transmitting the cybersecurity threat verification communication includes:
   electronically transmitting the cybersecurity threat verification communication to a digital verification queue of the cybersecurity event detection and response service; and
   displaying, via a web-based user interface of the cybersecurity event detection and response service, the cybersecurity threat verification communication.

4. The method according to claim 3, further comprising:
while displaying the cybersecurity threat verification communication:
   obtaining the input selecting the first selectable interface object of the cybersecurity threat verification communication.

5. The method according to claim 1, wherein:
the transmitting the cybersecurity threat verification communication includes:
   transmitting the cybersecurity threat verification communication via a bi-directional third-party messaging channel; and
   at the bi-directional third-party messaging channel identifying the input selecting the first selectable interface object or the second selectable interface object.

6. The method according to claim 1, wherein
the constructing the cybersecurity threat verification communication is further based on receiving a verification-triggering input selecting a user interface element displayed on a graphical user interface of the cybersecurity event detection and response service, wherein the user interface element, when selected, causes an execution of an automated verification workflow that automatically constructs the cybersecurity threat verification communication.

7. The method according to claim 1, wherein:
the cybersecurity threat verification communication further includes a text box data field that is configured to receive, as input, one or more text strings of cybersecurity event handling instructions from a subscriber associated with the target cybersecurity event.

8. The method according to claim 7, further comprising:
implementing, based on receiving the one or more text strings of cybersecurity event handling instructions, one or more programmable security heuristics that tunes an event detection and response mode of the cybersecurity event detection and response service for future inbound cybersecurity events of the subscriber.

9. The method according to claim 1, further comprising:
mitigating, via executing one or more cybersecurity threat mitigation actions, a cybersecurity threat associated with the target cybersecurity event based on identifying the input directed to the first selectable interface object of the cybersecurity threat verification communication.

10. A method for verification-informed handling of cybersecurity activity, the method comprising:
associating a service-computed threat severity level to a target cybersecurity event;
configuring a cybersecurity threat verification communication at a cybersecurity event detection and response service based on the target cybersecurity event, wherein the cybersecurity threat verification communication includes:
(a) a first selectable interface object that, when selected, provides an indication to the cybersecurity event detection and response service that the target cybersecurity event relates to a cybersecurity incident; and
(b) a second selectable interface object that, when selected, provides an indication to the cybersecurity event detection and response service that the target cybersecurity event relates to a valid cybersecurity event;
selectively identifying a communication transmission destination for the cybersecurity threat verification communication from a plurality of distinct communication transmission destinations based on a subscriber-defined cybersecurity policy and the threat severity level;
transmitting the cybersecurity threat verification communication to a subscriber based on the construction of the cybersecurity threat verification communication and the identification of the communication transmission destination; and
routing the target cybersecurity event to one of (1) a cybersecurity threat escalation route of the cybersecurity event detection and response service the cybersecurity threat escalation route comprising a cybersecurity incident queue of the cybersecurity event detection and response service, and (2) a cybersecurity threat de-escalation route of the cybersecurity event detection and response service the cybersecurity threat de-escalation route comprising a cybersecurity event disposal queue of the cybersecurity event detection and response service, based on receiving a subscriber response to the cybersecurity threat verification communication.

11. The method according to claim 10, wherein the subscriber response includes:
an input from the subscriber selecting the first selectable interface object of the cybersecurity threat verification communication or the second selectable interface object of the cybersecurity threat verification communication; and
one or more strings of text comprising cybersecurity event handling instructions.

12. The method according to claim 10, wherein:
the configuring the cybersecurity threat verification communication is further based on receiving a verification-triggering input selecting a user interface element displayed on a graphical user interface, wherein the user interface element, when selected, causes an execution of an automated verification workflow that automatically configures the cybersecurity threat verification communication.

13. The method according to claim 10, wherein:
the target cybersecurity event is routed to the cybersecurity threat escalation route of the cybersecurity event detection and response service, and the cybersecurity threat escalation route automatically generates one or more service-proposed remediation actions for the target cybersecurity event.

14. The method according to claim 10, further comprising:
executing an automated cybersecurity investigation workflow based on the target cybersecurity event, wherein executing the automated cybersecurity investigation workflow includes:
executing, by one or more computers, a plurality of distinct automated investigation tasks that automatically derives cybersecurity threat intelligence data associated with the target cybersecurity event,
automatically configuring the cybersecurity threat verification communication, and
automatically transmitting the cybersecurity threat verification communication to the subscriber.

15. A method for an automated verification-informed cybersecurity event routing and cybersecurity threat mitigation, the method comprising:
automatically configuring, by one or more computers, a cybersecurity threat confirmation message at a cybersecurity event detection and response service based on detecting a suspected cybersecurity event, wherein configuring the cybersecurity threat verification message includes:
associating a service-computed threat severity level to the suspected cybersecurity event;
deriving cybersecurity threat-informative content based on data associated with the suspected cybersecurity event;
installing the threat-informative content into the cybersecurity threat confirmation message together with a request for verification input from a cybersecurity administrator for confirming the suspected cybersecurity event as either a cybersecurity threat or not a cybersecurity threat;
configuring a first selectable interface object of the cybersecurity threat confirmation message that, when selected, provides an indication that the suspected cybersecurity event relates to a cybersecurity threat;
configuring a second selectable interface object of the cybersecurity threat confirmation message that, when selected, provides an indication that the suspected cybersecurity event does not relate to a cybersecurity threat;
selectively identifying a communication transmission destination for the cybersecurity threat confirmation message from a plurality of distinct communication transmission destinations based on a cybersecurity policy and the threat severity level;
transmitting the cybersecurity threat confirmation message to the cybersecurity administrator based on the construction of the cybersecurity threat confirmation message and the communication transmission destination; and
identifying a cybersecurity escalation route of the cybersecurity event detection and response service from a plurality of distinct cybersecurity escalation routes of the cybersecurity event detection and response service based on receiving a response to the cybersecurity threat confirmation message,
wherein in response to the identifying the cybersecurity escalation route, routing the suspected cybersecurity event to one of a first cybersecurity handling route that escalates a degree of cybersecurity threat of the suspected cybersecurity event, the first cybersecurity handling route comprising a cybersecurity incident queue of the cybersecurity event detection and response service, and a second cybersecurity handling route that de-escalates the degree of cybersecurity threat of the suspected cybersecurity event, the second cybersecurity handling route comprising a cybersecurity event disposal queue.

16. The method according to claim 15, wherein the cybersecurity policy defines a distinct communication transmission destination of the plurality of distinct transmission destinations for each of distinct threat severity level of a plurality of distinct service-computed threat severity levels.

* * * * *